Patented Oct. 26, 1937

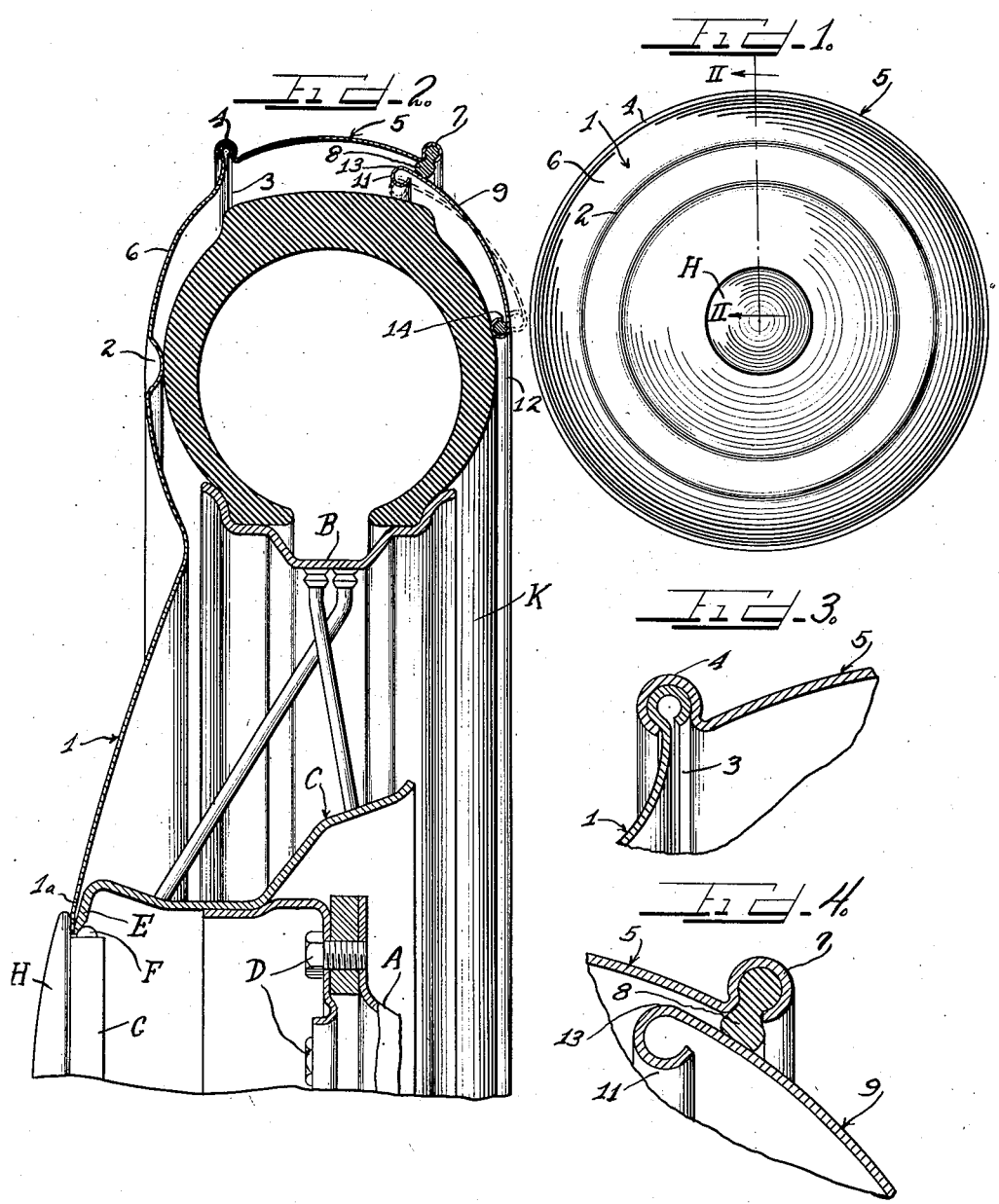

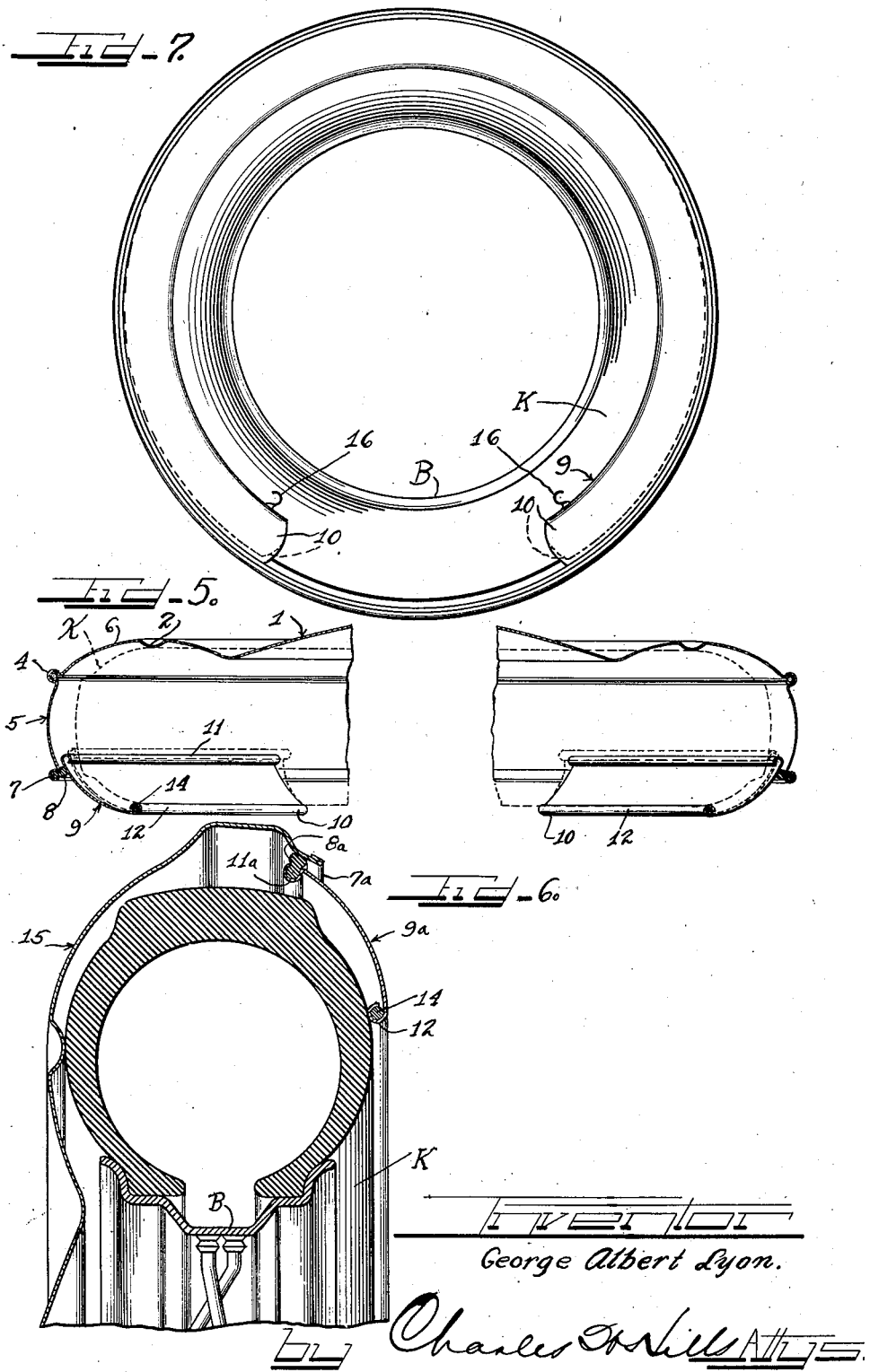

2,096,971

UNITED STATES PATENT OFFICE 2,096,971

TIRE COVER

George Albert Lyon, Detroit, Mich., assignor to Lyon Incorporated, Detroit, Mich., a corporation of Delaware Application August 21, 1933, Serial No. 686,032

12 Claims. (Cl. 150—54)

This invention has to do with tire covers and is concerned more particularly with an improved means whereby a tire cover may be releasably mounted on a spare tire.

It is an object of this invention to provide a tire cover formed to cover an exposed portion of a spare tire, with means which combines the function of assisting in covering the tire with the function of holding the first mentioned cover member on the tire.

It is another object of the invention to provide a tire cover of the multi-part type including an expansible and contractible member for covering a rear portion of the tire and at the same time serving to hold another part of the cover in proper tire protecting position.

It is a further object of the invention to provide a tire cover embodying a split resilient retaining part which is formed to be substantially rigid at its inner periphery and to be expansible and contractible at its outer periphery.

It is a further object of the invention to provide a substantially non-collapsible cover for an outer side wall and tread portion of a spare tire, with means for engaging the other side wall and causing the cover member to resiliently engage the opposite or first mentioned wall of the tire.

Another object of the invention resides in the provision of a cover comprising relatively stiff and expansible and contractible members, cooperating to cover side wall and tread portions of a spare tire while engaging the tire only on opposite side walls thereof.

It is further an object of the invention to provide inconspicuous means for releasably holding a tire cover in proper tire protecting position, together with means for cushioning said members against rattling.

In accordance with the general features of the invention, one part of the cover preferably comprises a drum-like member shaped to cover the outer side wall and substantially the entire tread of the tire, said member preferably terminating centrally at the mouth of the front wall of the hub of the spare wheel carrying the tire, to be engaged on opposite sides by the head of the hub cap and by said forward wall of the hub so as to be properly centered thereon. Another part comprises a preferably split resilient member formed to cover at least the outer half of the rear side wall of the tire and to extend over at least a part of the adjacent portion of the tread and within the rear margin of the first member. The second member is inherently expansible so that when so positioned, it resiliently engages the first member adjacent the outer periphery of the expansible member, and also engages at its inner periphery the rear side wall of the tire. The inherent expansibility of the second member serves also to urge the first member rearwardly, thus causing the same to engage the front side wall of the tire.

The cover parts are preferably formed of shape-retaining material such as sheet metal, and means are accordingly provided to cushion the cooperating parts of the tire cover apart to prevent rattling therebetween and to provide a friction grip to prevent looseness when the cover is assembled on a spare tire. The expansible member preferably has its margins bent to provide smooth edges and thereby avoid injury to the person handling the same. The inner margin preferably encloses a substantially rigid arcuate rod which holds the inner periphery of the expansible member substantially invariable, so that substantially only the remainder of said member flexes when an expansive or contractive force is exerted on said member.

Thus when it is desired to assemble the members of the cover, the first member is shoved rearwardly over the spare tire so that it substantially covers the outer side wall and the tread thereof with the rear margin of said member in spaced relation to the tread, and the expansible split member is placed adjacent the rear wall of the tire and then contracted to enable its outer periphery to pass forwardly to a position between the tread and the said margin of the first member. Due to the rigidity of the rod above mentioned, the contractive force upon the expansible member results in a movement of the entire split member with the exception of its inner periphery, in the general direction of the axis of the tire, and after the ring member is positioned as desired and the contractive pressure withdrawn, the same expands into resilient engagement with said margin of the first member, exerting a generally radially outward and rearward force upon said margin at the same time that the inner peripheral portion of the expansive member exerts a forward force upon the rear side of the tire. By this action, the first member is resiliently held in centered relation to the tire and the parts are resiliently held together against rattling. Rattling is preferably further prevented by the positioning of a cushioning strip between the adjacent cooperating portions of the cover members.

In accordance with one form of the invention, the first cover member may be formed as an integral piece. In accordance with another form of the invention, the first cover member may be formed of a side plate extending substantially to the tread of the tire, and a substantially circular band lock seamed to the outer margin of the disc. This makes for a reduced cost of manufacture due to the difficulty of bending the integral piece of stock at right angles to itself as in the forming of the tread covering portion.

The resilient member serves also to center the first member so that the hub cap for the spare wheel may be shoved into or withdrawn from the hub without interference from the tire cover.

The construction of the cover is such that the hub cap may be secured to the first mentioned member thereof and shoved into interlocking engagement with the hub at the same time that said first member is shoved into proper tire protecting position on the tire. The hub cap will thus hold said member in proper position to permit application of the expansive member as aforesaid.

Other objects and advantages of the invention will appear as the description proceeds.

This invention (in preferred forms) is illustrated in the drawings and hereinafter more fully described.

On the drawings:

Figure 1 is an elevational view of a tire cover construction embodying the principles of the present invention.

Figure 2 is an enlarged fragmentary sectional view taken substantially in the plane designated by the line II—II in Figure 1.

Figure 3 is a fragmentary enlarged view of the lock seam connecting parts of the cover construction.

Figure 4 is another enlarged view showing details of the structure enabling certain parts of the cover to cooperate.

Figure 5 is a fragmentary sectional view in full and dotted lines showing the manner in which one of the tire cover members is inserted in position to cooperate with the other member.

Figure 6 is a view similar to the upper half of Figure 2 but showing a modified form of the invention.

Figure 7 is a rear elevation of the structure shown in Figure 1.

As shown on the drawings:

Referring now more particularly to the drawings, a spare wheel carrier A, secured preferably permanently to any part of an automobile body such as at the rear or at a side alone or in conjunction with a well such as a fender well, carries a spare wheel B through the hub C by means of bolts D accessible only through the opening at the front E of the hub. The part E is formed to be engaged on its rear side by locking elements F carried by the sleeve portion G of a hub cap H, the locking elements F being either spring-pressed and readily releasable, or being controlled by a lock, as desired.

The tire cover built in accordance with one form of the invention comprises a disc 1 which is shaped to conform generally with the front side of the spare wheel and spare tire K and is formed with a central opening of substantially the same size as the opening in the front wall E of the hub, so as to provide means whereby the hub cap H may be connected thereto in substantially the same manner in which the hub cap H is secured to the hub C. The disc 1 is formed at its side wall covering portion with a rearwardly disposed projection 2 arranged to engage said side wall when the disc 1 is mounted in proper tire protecting position, and to hold the remainder of the disc in spaced relation to the tire. The outer peripheral margin of the disc 1 is curled to form a bead 3 which is lockingly received in a larger bead 4 arranged at the forward margin of a tread covering band 5. The portions 3 and 4 are interlocked by any desired operation as by spinning, lock seaming or the like. The side wall covering portion 6 of the disc 1 is preferably transversely arcuate to conform generally with the adjacent side wall of the tire K, and the band 5 is formed as a substantial continuation of the portion 6, in cross section, so that the disc 1 and band 5, when united at 3 and 4, have the appearance of a single integral piece provided with a combined ornamental and reinforcing bead at 3, 4. It is to be understood, of course, that the bead portions 3 and 4 could be reversely arranged so that the portion 3 is outermost.

The rear margin of the band 5 is curled upon itself at 7 to provide a socket in which a cushioning strip 8 of rubber or the like is firmly secured so that it projects inwardly of the body of the band 5.

The cover member comprising the disc 1 and band 5 united at 3 and 4 constitutes in effect an integral member of a drum-like character of such size as to properly receive the front and tread portions of the tire K and yet be mounted so as to be spaced from the tire and throughout a major portion thereof. The cover member is thereby enabled to accommodate tires of different widths and diameters. The disc 1, while made preferably of form-retaining sheet material such as sheet metal, is nevertheless capable of such slight flexing as would be necessary if a tire of different width from that shown were mounted on the spare wheel, in order that the projection 2 may properly engage the side wall of the tire at the same time that the inner peripheral portion 1a of the disc 1 is held engaged with the hub cap H and forward wall E of the hub C.

The band 5, by reason of its rigid connection with the disc 1, is held against flexing since it is made of form-retaining material such as sheet metal, the only part directly connected with the band 5 that is yieldable to any great extent being the cushioning strip 8. The strip material 8 need not be continuous, but may be in the form of a plurality of cushioning portions spaced apart sufficiently close together to perform substantially the same function.

The cover includes as another part thereof a separable member 9 also preferably formed of form-retaining material such as sheet metal. The member 9 is preferably split as shown in Figures 5 and 7 to provide spaced termini 10 and has its margins 11 and 12 curled to provide smooth edges which will not injure the hands or clothing. The material of which the member 9 is made is preferably resilient so that the member 9 may be flexed both longitudinally and transversely. The member 9 is formed longitudinally and transversely to extend over approximately one-half the rear side wall of the tire and over a portion of the tread adjacent the rear wall of the tire, when the member 9 is in proper cooperative relation to the drum-like member 1 of the tire. When unstressed, the member 9 at its outermost periphery 13 is of substantially greater diameter than the cushioning material 8 carried by the band 5, and the resilient property of the member 9 enables said outer peripheral portion to be contracted sufficiently to pass inwardly clear of and forwardly beyond the cushioning material H. When the contractive pressure is removed, the outer peripheral portion of the member 9 tends to assume its normal expanded condition and, in so doing, exerts an outward pressure upon the cushioning material 8 to thereby firmly hold the drum-like member in proper cooperative relation therewith and in proper tire protecting position.

To avoid buckling of the arcuate member 9 as the same is contracted, the inner margin 12 thereof is reinforced by a relatively stiff rod 14. The rod 14 is of such stiffness as to effectively resist substantial relative movement of its ends at an angle to the plane of the rod, so that the member 9 will be substantially prevented from assuming a helical shape when under contractive pressure. The reinforcing means 14 serves also to materially stiffen the inner margin of the member 9 to render the same rigid relative to the remainder of the member 9. Thus, when the member 9 is contracted as by urging the ends 10 thereof toward each other, said member will move radially inward and laterally forward of its inner periphery, so that its outer margin will not only be contracted but will be disposed in a plane at a greater distance from the inner margin than is normally the case.

The dotted line representation of a cross sectional part of the member 9 in Figures 2 and 5 shows the extent to which the member 9 is contracted and the shape it assumes when so contracted in order to pass forwardly beyond and clear of the cushioning material H. From the position shown in dotted lines in Figure 2, the member 9 is released, and upon such release, due to its tendency to straighten out transversely, its outer peripheral portion expands into tight engagement with the cushioning material 8 and at the same time the inner peripheral margin 12 of the member 9 is moved forwardly into firm engagement with the side wall of the tire.

The band 5 is constructed to extend rearwardly over the tread sufficiently to enable the member 9 to be contracted and passed forwardly beyond the rear margin of the band 5 as shown.

The member 9 is shaped transversely as a substantial continuation of the band 5 so that when the entire cover construction is assembled on a spare tire, it gives the appearance of a single integral cover in which the portions 4 and 7 appear as symmetrically arranged peripheral beads. The pressure exerted by the outer peripheral portion of the member 9 when in cooperative relation to the other cover member is in such a direction as to urge the other cover member rearwardly so as to hold the depression 2 against the forward wall of the tire, at the same time holding the inner margin 12 of the member 9 against the rear wall of the tire and spacing all other parts of the cover from the tire. The member 9, by virtue of its resilient property, is capable of successful cooperation with the drum-like cover member notwithstanding variations in the tire size accommodated thereby.

A somewhat modified form of the invention is shown in cross section in Figure 6, wherein the drum-like front cover member 15, instead of comprising united disc and tread band parts, consists of a one-piece structure in which the side and tread covering parts are integrally formed. Another variation in structure resides in the location of the cushioning strip material 8a in the outer peripheral curled margin 11a of the expansible and contractible resilient arcuate member 9a, instead of in the rear margin of the tread covering part as in the previously described form of the invention. The cooperation of the parts 9a and 15 is identical with the cooperation of the parts 9 and 1 and 5 of the above described form of the invention, and to explain the same at this point would involve needless duplication. The rear margin of the drum-like member 15 is returned at 7a to provide a smooth edge.

The stiffening and reinforcing rod 14 and the cushioning strips 8 and 8a may be fastened in place in any suitable way as by spinning operations. If desired, suitable handle projections such as finger grips 16 may be provided at the termini 10 to enable said termini to be more easily grasped and the member 9 thus more easily manipulated so that the same may be contracted.

The holding members 9 and 9a are so arranged as to be out of sight when the cover is viewed from the front, and is attractive even when visible as when the cover is viewed from the sides or top, in view of the fact that the transverse curvatures of the members 9 and 9a are substantial continuations of the curvatures of the adjacent rear portions of the other tire cover parts with which the members 9 and 9a cooperate.

The members 9 and 9a serve to hold the other cooperative parts of the tire cover firmly and coaxially on the tire in such a manner that the cover is not disturbed by application or removal of the hub cap H, so that when it is desired to remove the spare wheel B from the carrier A, removal of the cover is not necessary.

It will be appreciated that contact with the tire may be at 11, 11a or at 12 or all, depending on the degree of wear and inflation, and on the size and shape, of the tire.

The rod or wire 14 may be made of any suitable spring material such as spring steel.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a multi-part tire cover, a split arcuate member shaped to conform to a part of a tire and having a resiliently expansible and contractible margin and a relatively rigid margin disposed in different planes, whereby when the first margin is flexed to an abnormal diameter, it is disposed in an abnormal relation to the second margin and exerts pressure tending to return it to its normal relation to the second margin.

2. In a multi-part tire cover, a split arcuate member of form-retaining sheet material shaped to conform to a part of a tire and having a resiliently expansible and contractible margin and a margin provided with a relatively rigid reinforcing strip, said margins being disposed in different planes, whereby when the first margin is flexed to an abnormal diameter, it is disposed in an abnormal plane relative to the second margin and exerts pressure tending to return it to its normal plane relative to the second margin.

3. In a multi-part tire cover, a split arcuate member shaped to conform to a part of a tire and having a resiliently expansible and contractible margin and a relatively rigid margin disposed in different planes, whereby when the resilient margin is flexed to an abnormal diameter, it is disposed in an abnormal plane relative to the rigid margin and exerts pressure tending to return it to its normal plane relative to the rigid margin, said margins being normally of different diameters and dimensioned so that one margin presses against the tire while the other margin presses against another tire cover member when in proper cooperative relation thereto.

4. A spare tire cover comprising a disc formed to cover a side of a tire and having a circular bead at its outer periphery and in spaced relation to the tire when the disc is in proper tire protecting position, and a band formed to cover the tread of the tire and having circular marginal beads arranged to be symmetrical with respect to the median plane of the tire, one of said marginal beads being nested with the first bead so as to substantially integrally unite said disc and band to form a drum-shaped cover, the other of said marginal beads being nested with a projecting yieldable cushioning strip for engaging and spacing another cover member from the disc.

5. In a multi-part tire cover, a split arcuate member shaped to conform to a part of a tire and having a resiliently expansible and contractible margin and a relatively rigid margin disposed in different planes, whereby when the resilient margin is flexed to an abnormal diameter, it is disposed in an abnormal plane relative to the rigid margin and exerts pressure tending to return it to its normal plane relative to the rigid margin, said margins being normally of different diameters and dimensioned so that one margin presses against the tire while the other margin presses against another tire cover member when in proper cooperative relation thereto, said other margin having cushioning means for spacing said split member from the cooperating member.

6. In a multi-part spare tire cover, a drum-like part for disposition over the front wall and tread of the tire, with the rear margin extending toward the tread, a part for disposition at the rear of the tire and having a resilient, outer portion of normally greater radius than said margin, but flexible forwardly of its inner portion so as to be contracted sufficiently to pass inwardly by said margin, said outer portion thereafter pressing rearwardly against said margin while said inner portion presses against the tire to thereby hold said parts in proper tire protecting cooperation, said second part being split and arcuate and the inner portion of the second part being relatively rigid so that when the second part is contracted, the outer portion is shifted laterally as well as radially inward relative to the inner portion.

7. In a multi-part spare tire cover, a drum-like part for disposition over the front wall and tread of the tire, with the rear margin extending toward the tread, a part for disposition at the rear of the tire and having a resilient, outer portion of normally greater radius than said margin, but flexible forwardly of its inner portion so as to be contracted sufficiently to pass inwardly by said margin, said outer portion thereafter pressing rearwardly against said margin while said inner portion presses against the tire to thereby hold said parts in proper tire protecting cooperation, said second part being split and circular and the inner portion thereof being disposed substantially entirely in one plane and being relatively inflexible from said plane, so as to prevent buckling of said second part when the same is contracted.

8. In a multi-part cover for a spare tire, an arcuate part for disposition over the front wall and tread of a tire and having a forwardly facing abutment at its tread covering portion, an arcuate split part for disposition over the rear wall and tread of the tire and having a resilient forward margin engageable with said abutment when said forward margin is contracted, said second part having a relatively rigid rear margin engageable with the rear wall of the tire, the engaging portions of said margins being normally disposed in planes closer together than when engaged with said abutment and rear side wall, respectively, whereby, after said resilient margin is contracted and telescoped with the first part, said second part exerts a rearward and outward pressure on said abutment and firmly holds and centers said first part on the tire.

9. In a multi-part tire cover, a substantially circular member shaped to conform to a part of a tire and having a resiliently expansible and contractible split marginal portion and a relatively rigid portion disposed in different planes, whereby when the first portion is flexed to an abnormal diameter, it is disposed in an abnormal relation to the second portion and exerts pressure tending to return it to its normal relation to the second portion.

10. In a multi-part spare tire cover, a member for disposition over the tread of the tire, with a part spaced from and extending toward the axis of the tire, a member for disposition at a side of the tire and having a relatively rigid inner portion and a relatively resilient split outer portion of normally greater radius than said part, but flexible laterally of said inner portion so as to be contracted sufficiently to pass inwardly by said part, said outer portion thereafter resiliently pressing rearwardly against said part while said inner portion presses against the tire to thereby hold said members in proper tire protecting cooperation.

11. In a spare tire, tire support and cover assembly, a pair of cover members for disposition over adjacent parts of a tire and engageable with opposite parts of the assembly of the spare tire and support, and having adjacent interengageable complemental portions cooperative to hold the members together in proper tire protecting position, one of said portions being resiliently expansible and contractible so as to be releasably engageable with the other portion, the member having said resilient portion being relatively rigid adjacent said resilient portion so that when said portions are interengaged, the resilience of said resilient portion causes said one member to be pressed against one part of the assembly as said resilient portion is pressed against said other portion.

12. In an assembly including a spare tire connected to an attaching portion disposed centrally of the tire, a cover comprising a drum-like part for disposition over the front of the assembly and over the tread of the tire, and having a substantially central portion arranged to be disposed in front of and aligned with the attaching portion for securement thereto, transversely extending centrally disposed securing means adapted to project transversely inwardly of the assembly and provided with means engageable with said portions when the same are aligned to mount said part in centered relation to the support, and resilient means engageable with the rear side of the tire and with the inner surface of the drum-like part under pressure in opposite directions for holding said portions centered relative to each other preparatory to and during application of said securing means.

GEORGE ALBERT LYON.